No. 647,949. Patented Apr. 24, 1900.
G. DÜRR.
WATER TUBE BOILER.
(Application filed Apr. 25, 1899.)
(No Model.)

UNITED STATES PATENT OFFICE.

GUSTAV DÜRR, OF DUSSELDORF, GERMANY.

WATER-TUBE BOILER.

SPECIFICATION forming part of Letters Patent No. 647,949, dated April 24, 1900.

Application filed April 25, 1899. Serial No. 714,355. (No model.)

*To all whom it may concern:*

Be it known that I, GUSTAV DÜRR, a citizen of Germany, and a resident of Dusseldorf, Germany, have invented certain new and useful Improvements Relating to the Water-Tubes of Tubular Steam-Generators, of which the following is a specification.

This invention relates to a device for closing the lower or narrow ends of inclined field-tubes.

Figure 1:
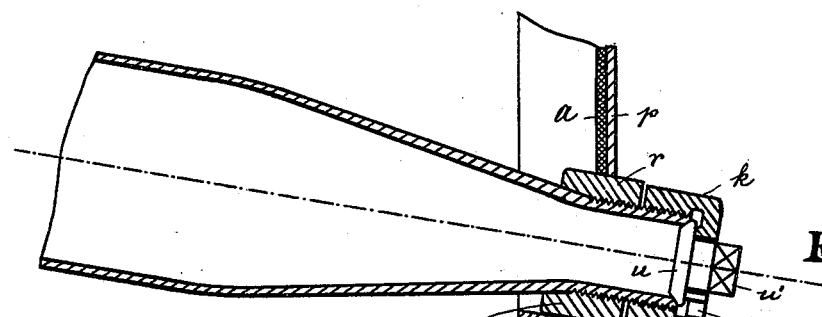
Figure 2:
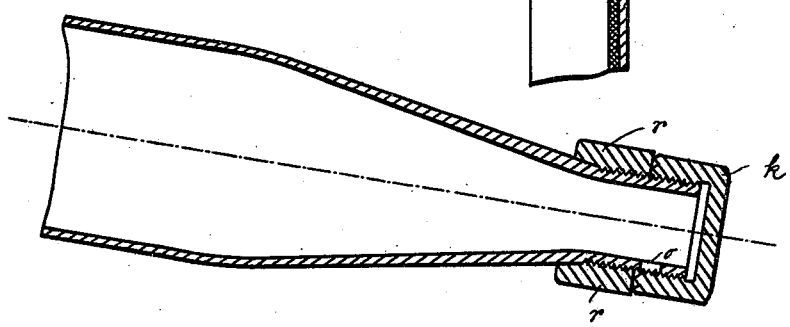
Figure 3:
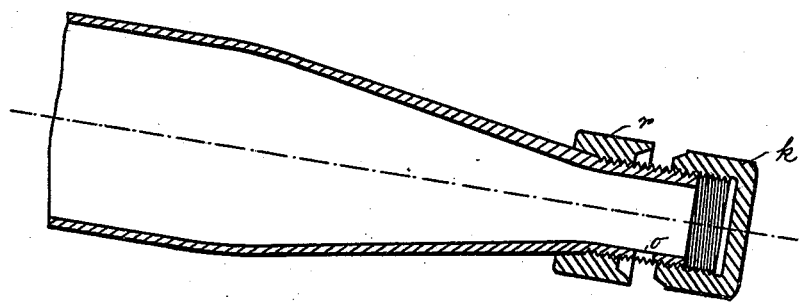
Figure 4:
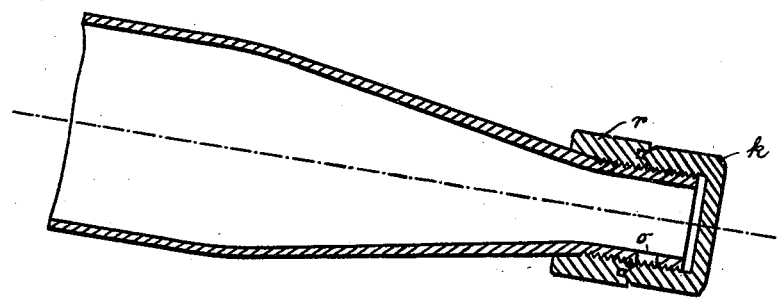

In the accompanying drawings, Figure 1 is an axial section through the narrow or lower end of a field-tube embodying this invention. Figs. 2, 3, and 4 represent modifications.

The narrow end of the tube is provided with an external screw-thread and closed by a screw-cap $k$, which forms a nut fitting over the said screw-thread. A steam-tight joint or packing for the tube may be formed at the mouth of the tube by causing the smooth bottom of the screw-cap to press against the same directly, or, as represented by Fig. 1, by means of a washer $u$, interposed between the mouth of the tube and the screw-cap, or the end of the tube may be armed with a ferrule $r$, against which presses the front edge or face of the screw-cap. The face of the ferrule and of the screw-cap are shaped so as to insure a good joint—for instance, in the manner represented by Fig. 4.

The washer $u$ may have a square stud $u'$ or other suitable projection, which enables the washer to be turned on its seat in order to form a reliable joint. The ferrules or collars $r$ have a slightly-larger diameter than the cap $k$ and serve at the same time to close the rear wall of the boiler, as indicated by Fig. 1.

The rear ends of the tubes are held in the usual manner by the grid-shaped boiler-wall or other suitable means, and a cover-plate $p$, provided with openings corresponding to the diameter of the ferrules $r$, is mounted on the boiler-wall. The cover-plate $p$ is lined with a sheet or layer of asbestos or asbestos fabric $a$, which slightly overlaps the edges of the openings, so as to fit tightly upon the ferrules. A tight joint may, however, be formed between the boiler-wall and the screw-cap $k$. For conveniently drawing the water off the tubes the latter may have radial orifices $o$, which are laid free by screwing back the cap a short distance, as represented by Figs. 2 to 4. The orifices $o$ may, however, be formed in the screw-cap, as indicated by Fig. 1. If this cap is screwed back a little, so as to loosen the washer $u$, water or steam is allowed to escape through the openings $o$ of the cap.

I claim—

1. The combination of a boiler-tube having a contracted and screw-threaded rear end, with a screw-cap adapted to close the same, one of said parts having orifices for allowing the escape of water when the cap is partly unscrewed, substantially as specified.

2. A boiler-tube having a contracted threaded rear end, a sleeve and cap engaging the same, combined with a perforated cover-plate that surrounds the sleeve, substantially as specified.

Signed by me at Dusseldorf, Germany, this 4th day of April, 1899.

GUSTAV DÜRR.

Witnesses:
WILLIAM ESSENWEIN,
GEO. P. PETTIT.